(12) United States Patent
Huang

(10) Patent No.: US 8,468,224 B2
(45) Date of Patent: Jun. 18, 2013

(54) METHOD FOR MANAGEMENT OF CUSTOMER PREMISES EQUIPMENT

(75) Inventor: Cheng-Yi Huang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 243 days.

(21) Appl. No.: 12/960,468

(22) Filed: Dec. 4, 2010

(65) Prior Publication Data

US 2012/0042057 A1    Feb. 16, 2012

(30) Foreign Application Priority Data

Aug. 10, 2010  (CN) .......................... 2010 1 0249703

(51) Int. Cl.
*G06F 15/177* (2006.01)
(52) U.S. Cl.
USPC ........................................................ 709/221
(58) Field of Classification Search
None
See application file for complete search history.

(56) References Cited

U.S. PATENT DOCUMENTS

| | | | |
|---|---|---|---|
| 5,684,990 A * | 11/1997 | Boothby | 395/619 |
| 7,680,833 B1 * | 3/2010 | Cole et al. | 707/999.201 |
| 2003/0237047 A1 * | 12/2003 | Borson | 715/513 |
| 2004/0049566 A1 * | 3/2004 | Mattila et al. | 709/223 |
| 2007/0104119 A1 * | 5/2007 | Sarkar et al. | 370/254 |
| 2008/0010358 A1 * | 1/2008 | Jin | 709/207 |
| 2008/0133718 A1 * | 6/2008 | Bouchat et al. | 709/220 |

* cited by examiner

*Primary Examiner* — Chirag G Shah
*Assistant Examiner* — Rina Pancholi
(74) *Attorney, Agent, or Firm* — Altis Law Group, Inc.

(57) ABSTRACT

A customer premises equipment (CPE) and related method uses a configuration file that updates parameters of the CPE by connecting to an operator server. A determination is made if the configuration parameters of the CPE device correspond to the configuration parameters in the operator individually, and the configuration parameter values of the operator are assigned to the configuration parameter values of the CPE when the configuration parameters of the CPE correspond to the configuration parameters in the operator.

4 Claims, 10 Drawing Sheets

METHOD FOR MANAGEMENT OF CUSTOMER PREMISES EQUIPMENT

BACKGROUND

1. Technical Field

The present application is related to method for management of a terminal device, and especially to a method for updating parameters of customer premises equipment (CPE).

2. Description of Related Art

Customer premises equipments (CPE) often store configuration files that comprise parameters related to the operation of the CPE. These parameters can be updated through the Internet. In such a case, the CPE receives the parameters, individually compares details of the parameters to those previously stored in the CPE, and updates the parameters as needed. The comparison and update processes are time-consuming and inefficient.

DETAILED DESCRIPTION

In general, the word "module" as used herein, refers to logic embodied in hardware or firmware, or to a collection of software instructions, written in a programming language, such as, for example, Java, C, or assembly. One or more software instructions in the unit may be integrated in firmware, such as an EPROM. It will be appreciated that module may comprise connected logic units, such as gates and flip-flops, and may comprise programmable units, such as programmable gate arrays or processors. The unit described herein may be implemented as either software and/or hardware unit and may be stored in any type of computer-readable medium or other computer storage device.

Figure 1:
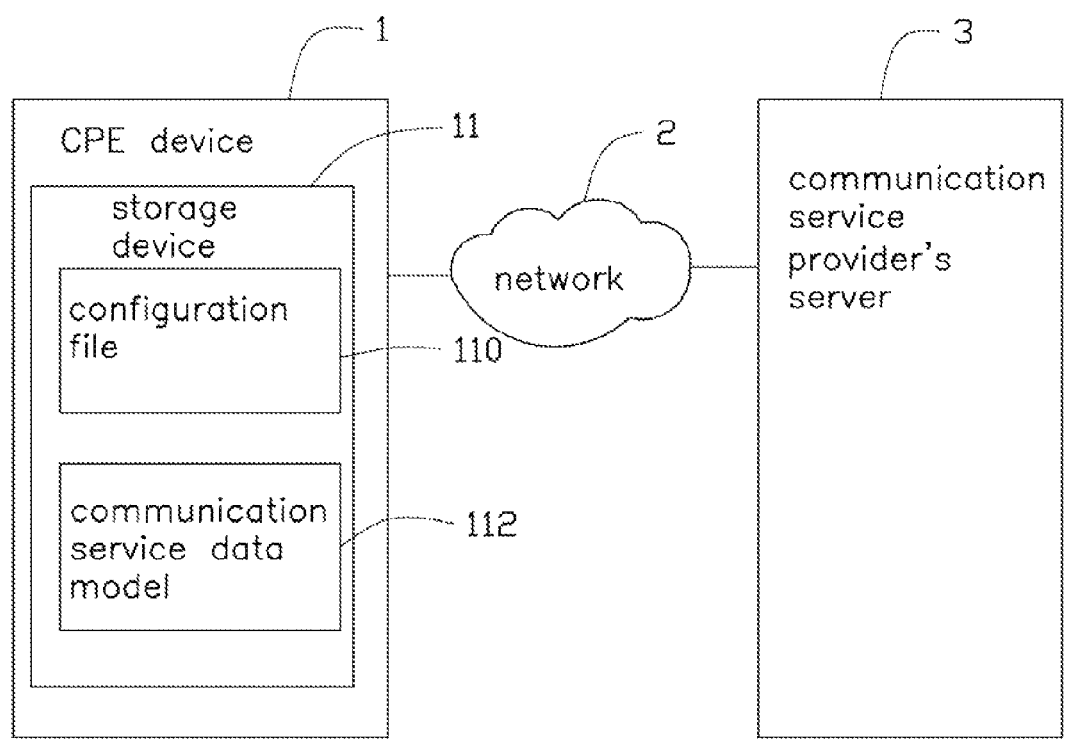
FIG. 1 is a block diagram of one embodiment of a CPE device as disclosed.

FIG. 1 is a block operation diagram of one embodiment of a customer premises equipment (CPE) device 1 as disclosed. The CPE device 1 connects to a server 3 of a communication service provider via a network 2. For example, the CPE device 1 can be a worldwide interoperability for microwave access (WIMAX) device, or other terminal device. The communication service provider can be a WIMAX service provider, for example. The network can be an intranet, the Internet, or other communication network. The CPE device 1 comprises a storage unit 11 comprising a configuration file 110 and a communication service data model 112 to store data. The configuration file 110 records parameters relating to the CPE device 1. The communication service data model 112 records parameters provided by the communication service provider's server 3.

Figure 2:
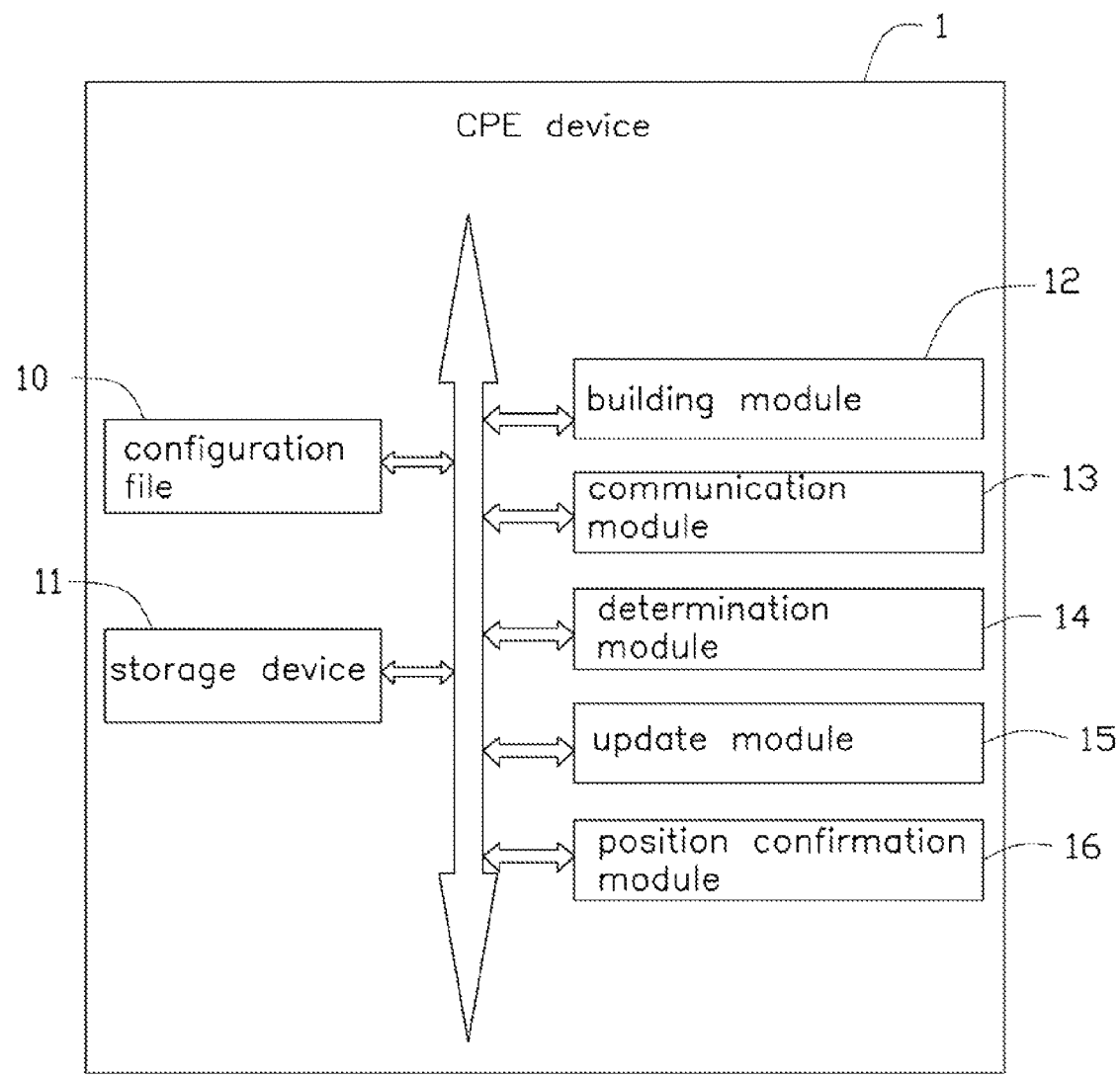
FIG. 2 is a functional block diagram of one embodiment of the CPE device as disclosed.

FIG. 2 is a functional block diagram of one embodiment of a CPE device as disclosed. The CPE device 1 comprises a building module 12, a communication module 13, a determination module 14, an update module 15 and a position confirmation module 16. The CPE device 1 further comprises a processor 10 to execute instructions for one or more computerized codes of the modules 12-16.

The tree-generation module 12 generates a device parameter tree based on names of device parameters (e.g., names of devices/ports that can be connected to or communicate with the CPE 1) recorded in the configuration file 110 of the CPE device 1. The parameter names can be listed according to a hierarchical structure. The tree-generation module 12 also generates an operator parameter tree of the communication service provider based on the data model 112, according to a hierarchical structure of the parameter names.

Figure 3:
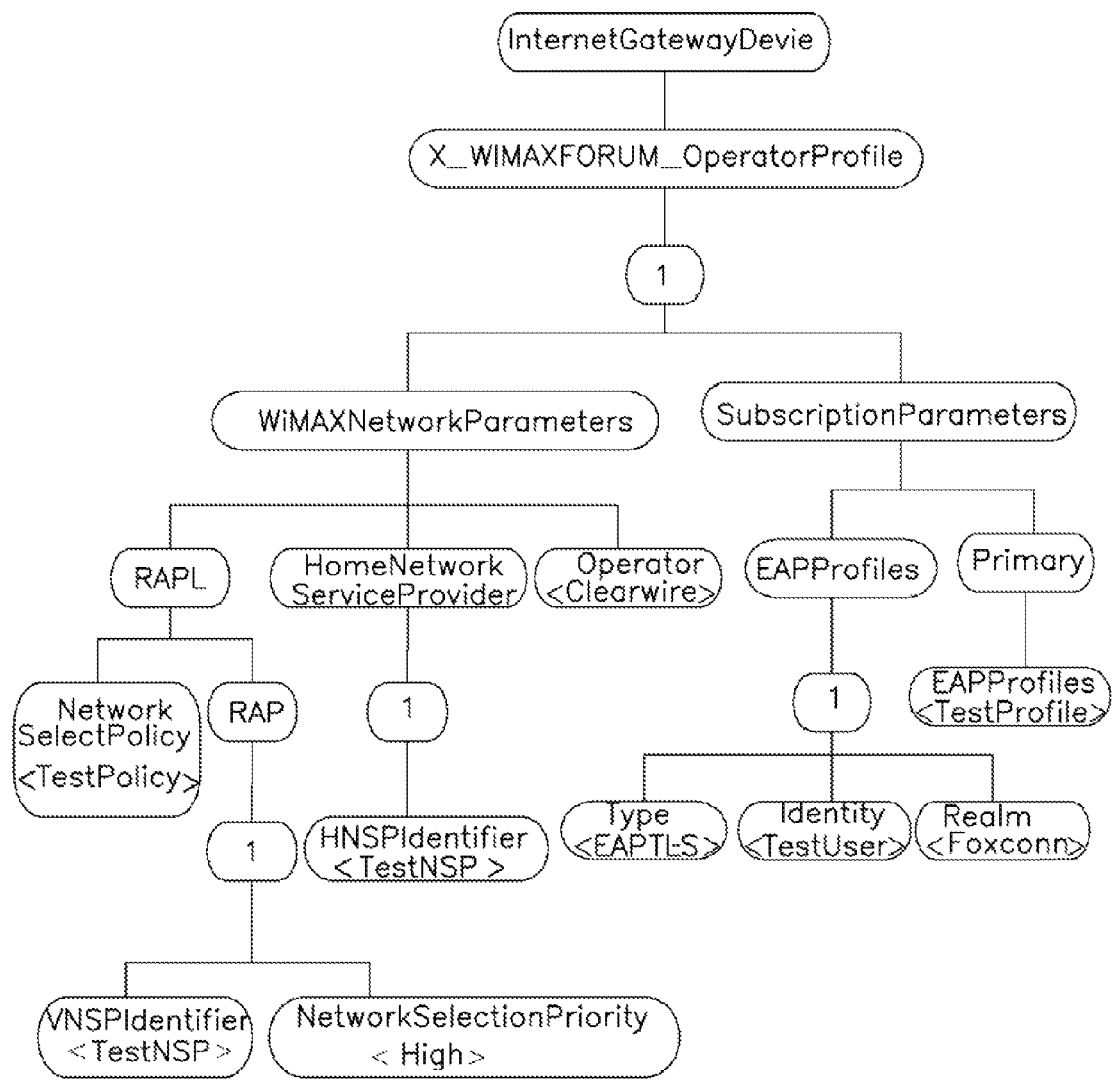
FIG. 3 is an embodiment of the present application which illustrates an operator parameter tree.
Figure 4:
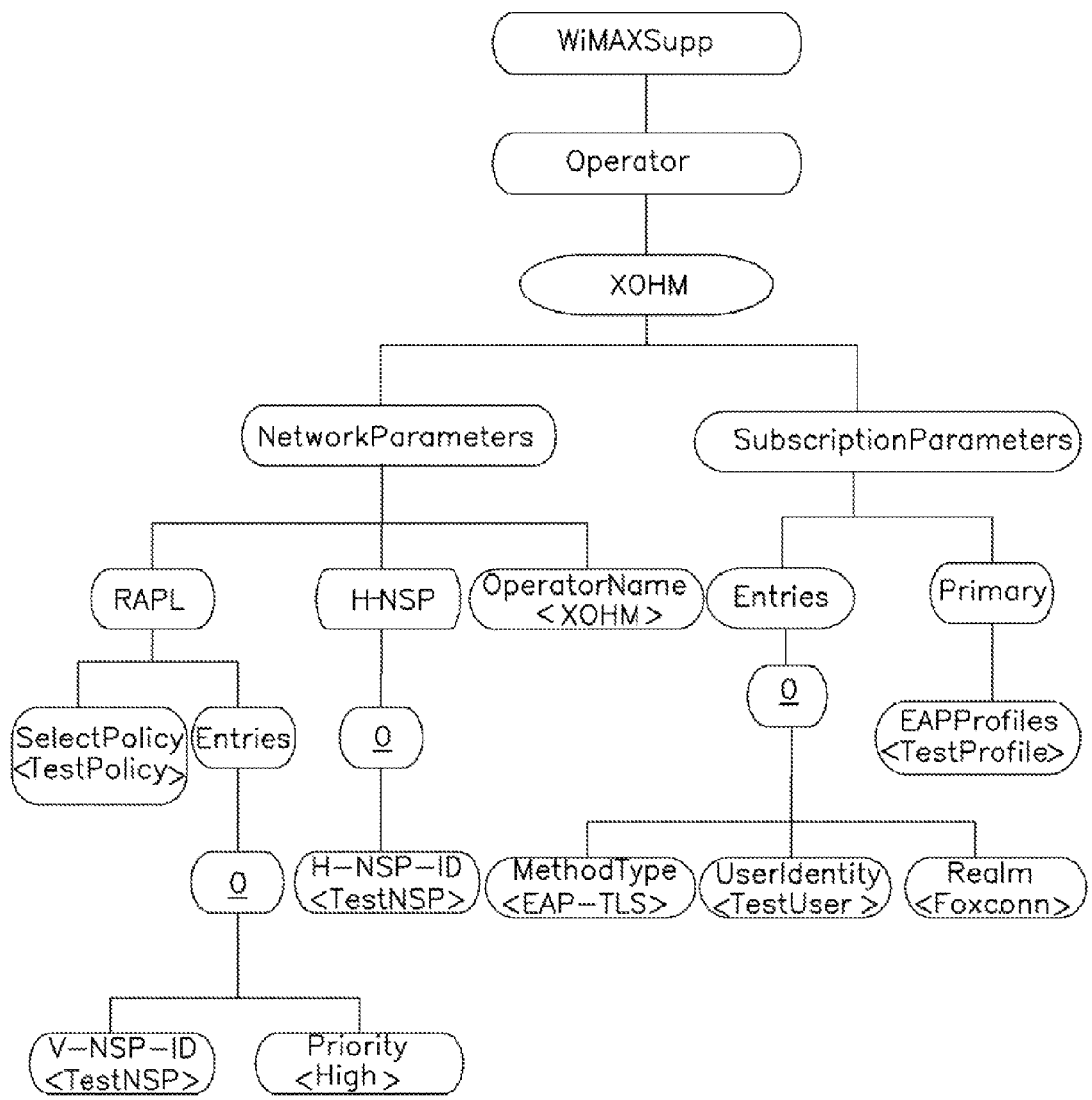
FIG. 4 is an embodiment of the present application which illustrates a device parameter tree.

FIG. 3 is an embodiment of the present application which illustrates an operator parameter tree. FIG. 4 is an embodiment of the present application which illustrates a CPE parameter tree. In FIG. 3 and FIG. 4, the names of parameter in the operator tree maybe different from those in the CPE parameter tree, but may correspond to the same parameters. For example, the parameter value "clearwire" corresponds to the parameter name of "Operator" in the operator parameter tree, but corresponds to the parameter name of "Operator Name" in the CPE parameter tree.

The communication module 13 electronically connects the CPE device 1 and the operator server 3 through the network 2, and receives configuration data from the operator server 3. The configuration data comprises configuration parameters and configuration parameter values.

The determination module 14 determines if the hierarchy of the device parameter tree corresponds to those of the operator parameter tree. If the hierarchy of the device parameter tree is determined to correspond to that of the operator parameter tree, the determination module 14 further determines if the configuration parameters of the device parameter tree correspond to those of the operator parameter tree. If the configuration parameters of the device parameter tree correspond to those of the operator parameter tree, the device parameter tree is determined to match with the operator parameter tree. If the hierarchy of the device parameter tree does not correspond to that of the operator parameter tree, the device parameter tree is determined not to match with the operator parameter tree.

When the device parameter tree matches the operator parameter tree, an update module 15 assigns the parameter values of the operator parameter tree (referred as "operator parameter values" hereinafter) to the parameter values of the device parameter tree (referred to as CPE device parameter values). A location confirmation module 16 confirms that the location of parameters of the operator parameter tree corresponds to the location of the CPE device parameter tree.

Figure 5:
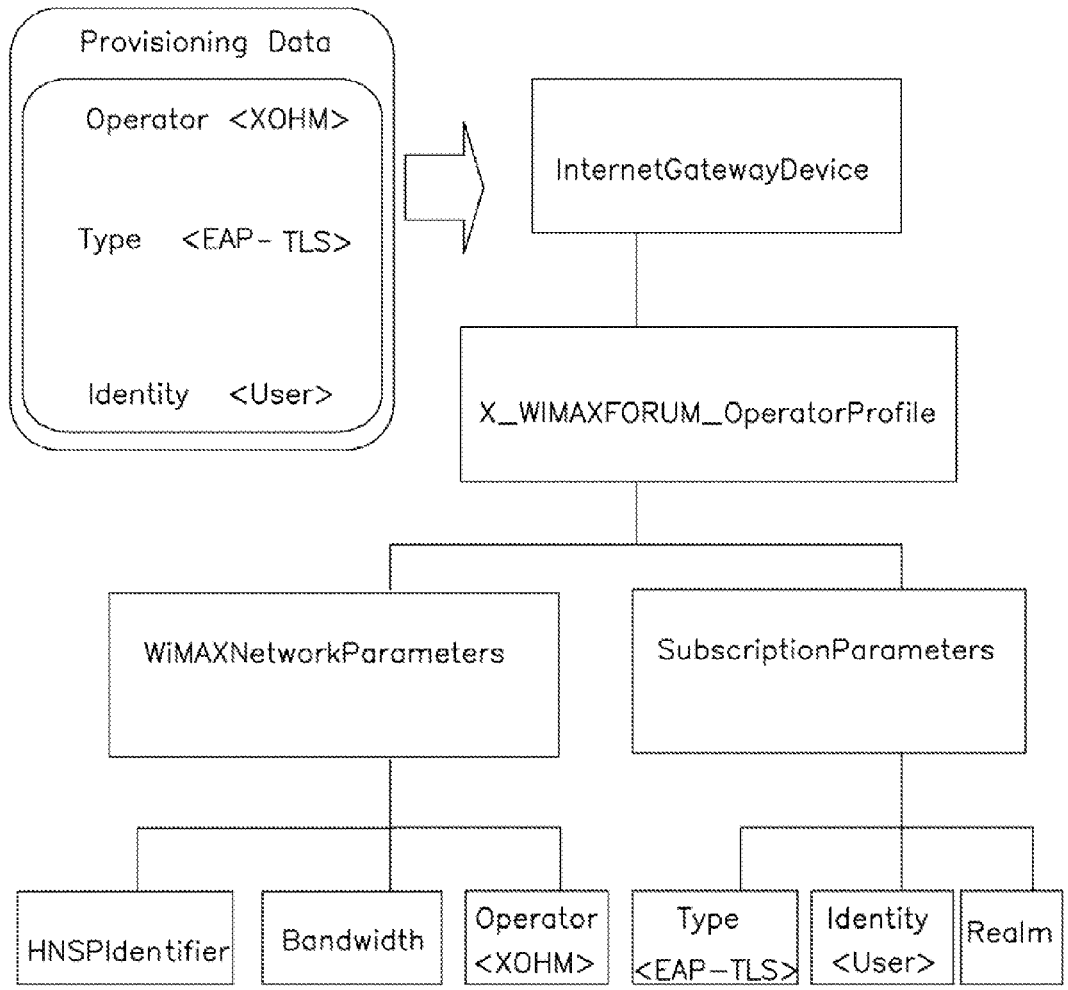
FIG. 5 is an illustration drawing of the update progress of the operator parameter tree.

FIG. 5 is an illustration of update progress of the operator parameter tree. The configuration parameters comprise "Operator", "Type", "Identity", corresponding to the parameter values of "XOHM", "EAP-TLS", and "User", respectively. In the operator parameter tree, parameter "Operator" is the third of the fourth level, wherein the third of the fourth level is the first location of parameter "Operator".

Figure 6:
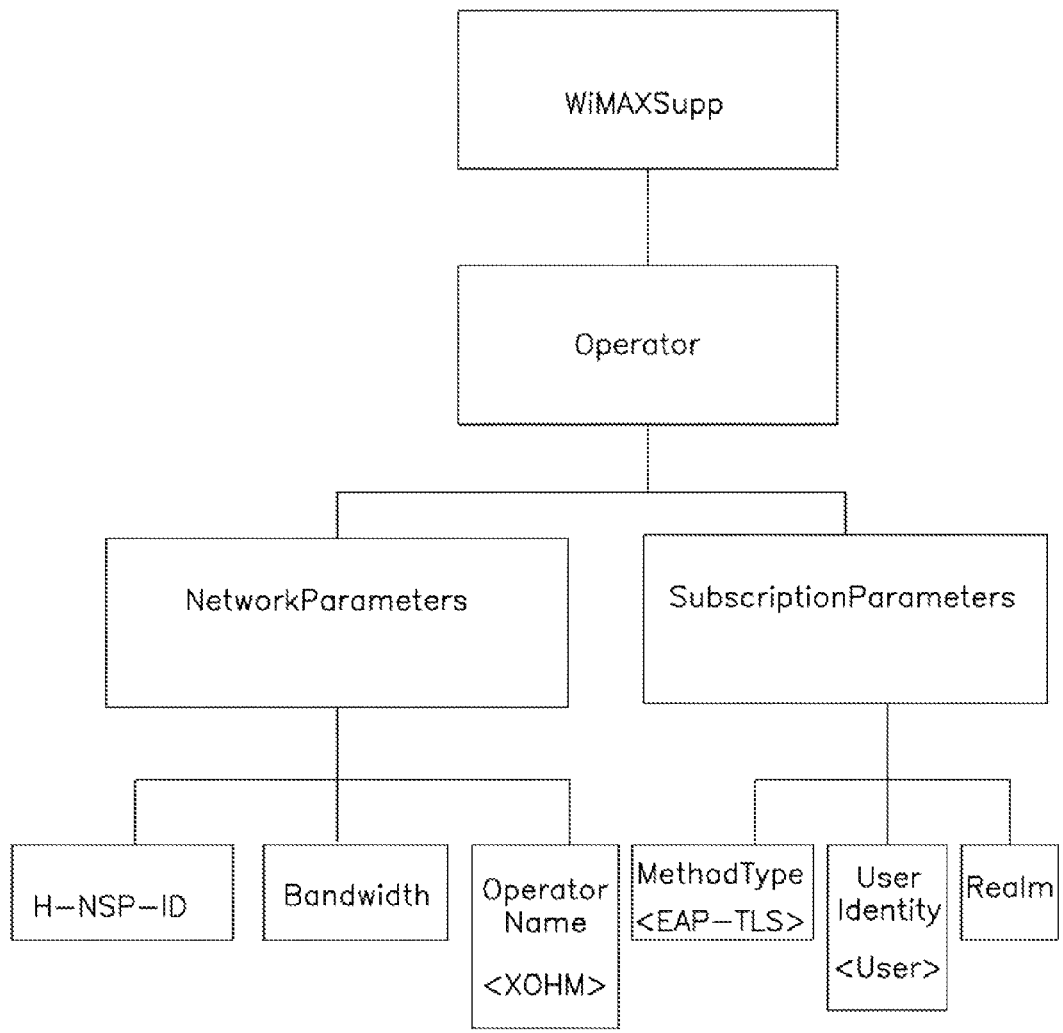
FIG. 6 is an illustration drawing of the update progress of the CPE parameter tree.

FIG. 6 is an illustration drawing of the update progress of the CPE parameter tree. The location confirmation module 16 identifies a second location of parameter "Operator" as the third of the fourth level of the CPE the CPE device parameter tree, and confirms that the first location matches the second location. After confirmation, the update module 15 assigns the value of the parameter "Operator" in the operator parameter tree to the value of the parameter in the CPE tree. Therefore, the CPE parameters are updated.

Figure 7:
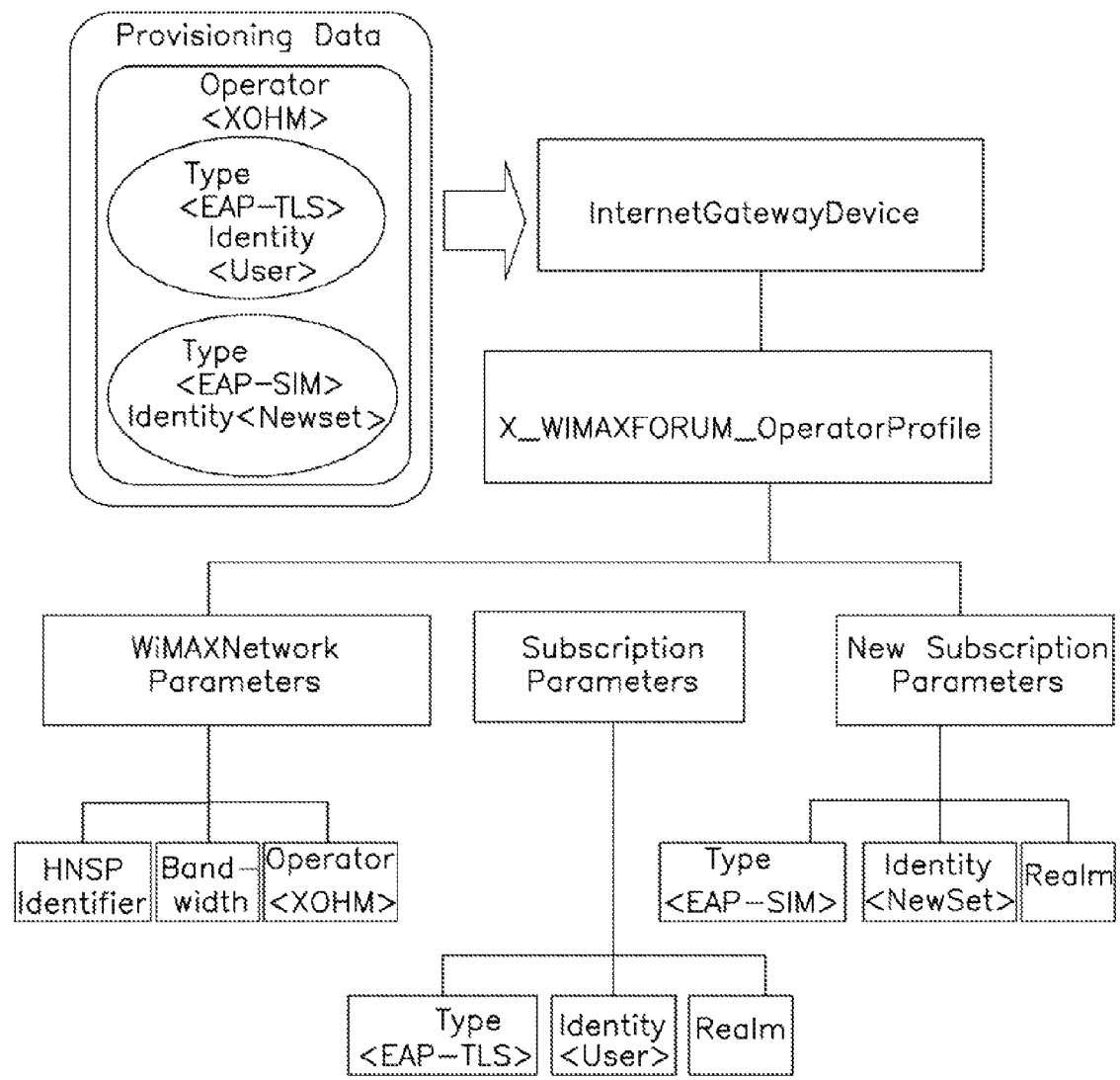
FIG. 7 is an drawing illustrating another embodiment of an update of the operator parameter tree.

When the CPE parameter tree does not match the operator parameter tree, the update module 15 maps the branches of the operator parameter tree on the CPE parameter tree. FIG. 7 is an illustration of an update of the operator parameter tree, wherein the parameter "Type" corresponds to two configuration parameter values: "EAP-TLS" and "EAP-SIM". However, the parameter "Type" in e CPE parameter tree only comprises a parameter value "Type". The update module 15 copies the hierarchy of the operator tree on the CPE tree, and creates a new parameter branch "Type" on the CPE parameter tree. Furthermore, the update module assigns the parameter value "EAP-TLS" to the original parameter "Type", and assigns the parameter value "EAP-SIM" to the new parameter "Type".

Figure 8:
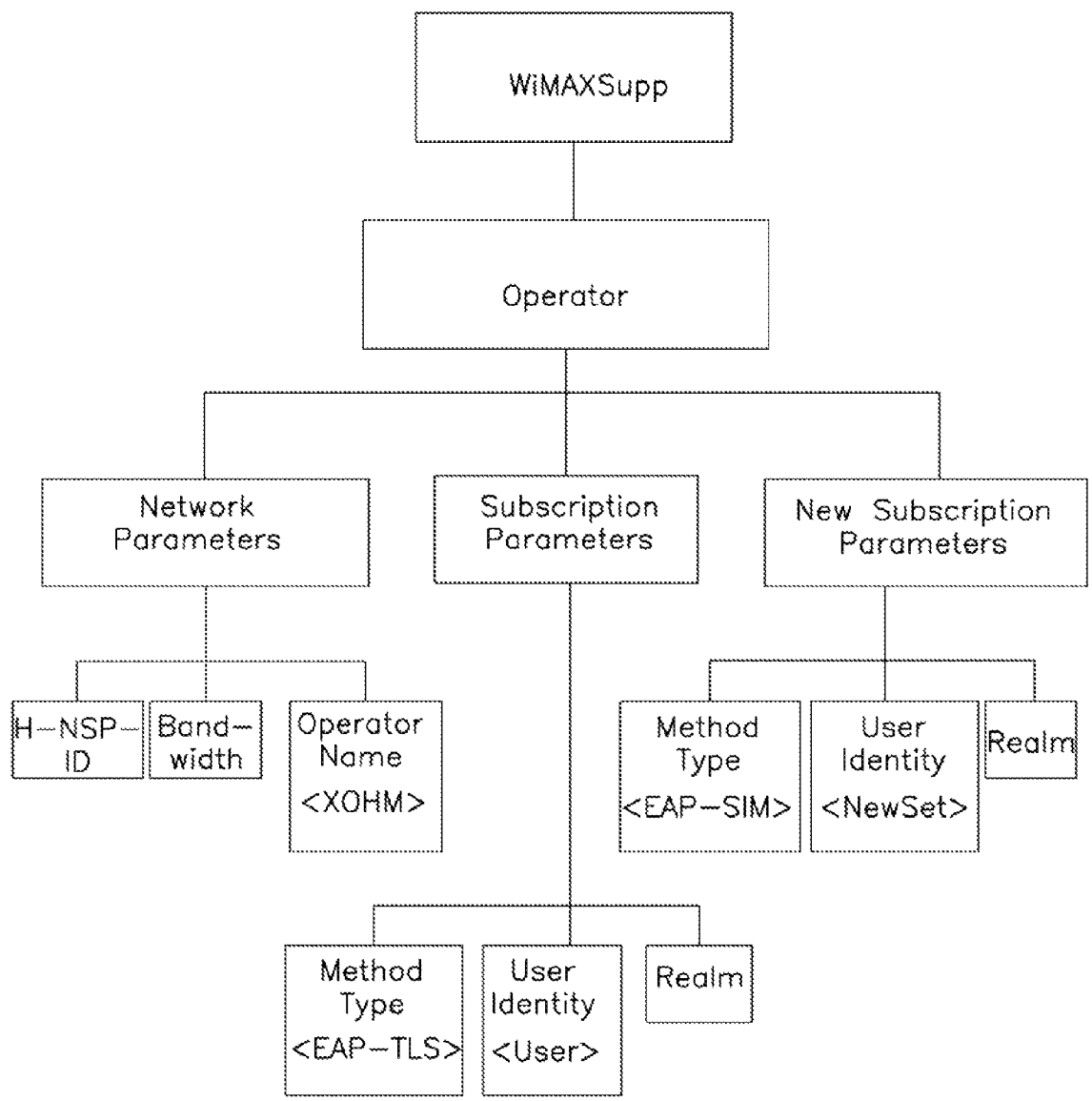
FIG. 8 is another illustration drawing of an update of the CPE parameter tree.

The update module 15 assigns new parameter value to the CPE parameter tree, and also copies new hierarchy in the operator tree on the CPE tree. In FIG. 8, another illustration drawing of an update of the update module 15, the update module 15 creates a new branch in the CPE parameter tree according to the hierarchy of the operator parameter tree. For example, the parameter "Type" in the CPE parameter tree corresponds to a new parameter "MethodType" in the operator parameter tree. After updating the hierarchy of the CPE parameter tree, the update module 15 assigns new parameters of the operator tree to the corresponding ones of the CPE parameter tree.

Figure 9:
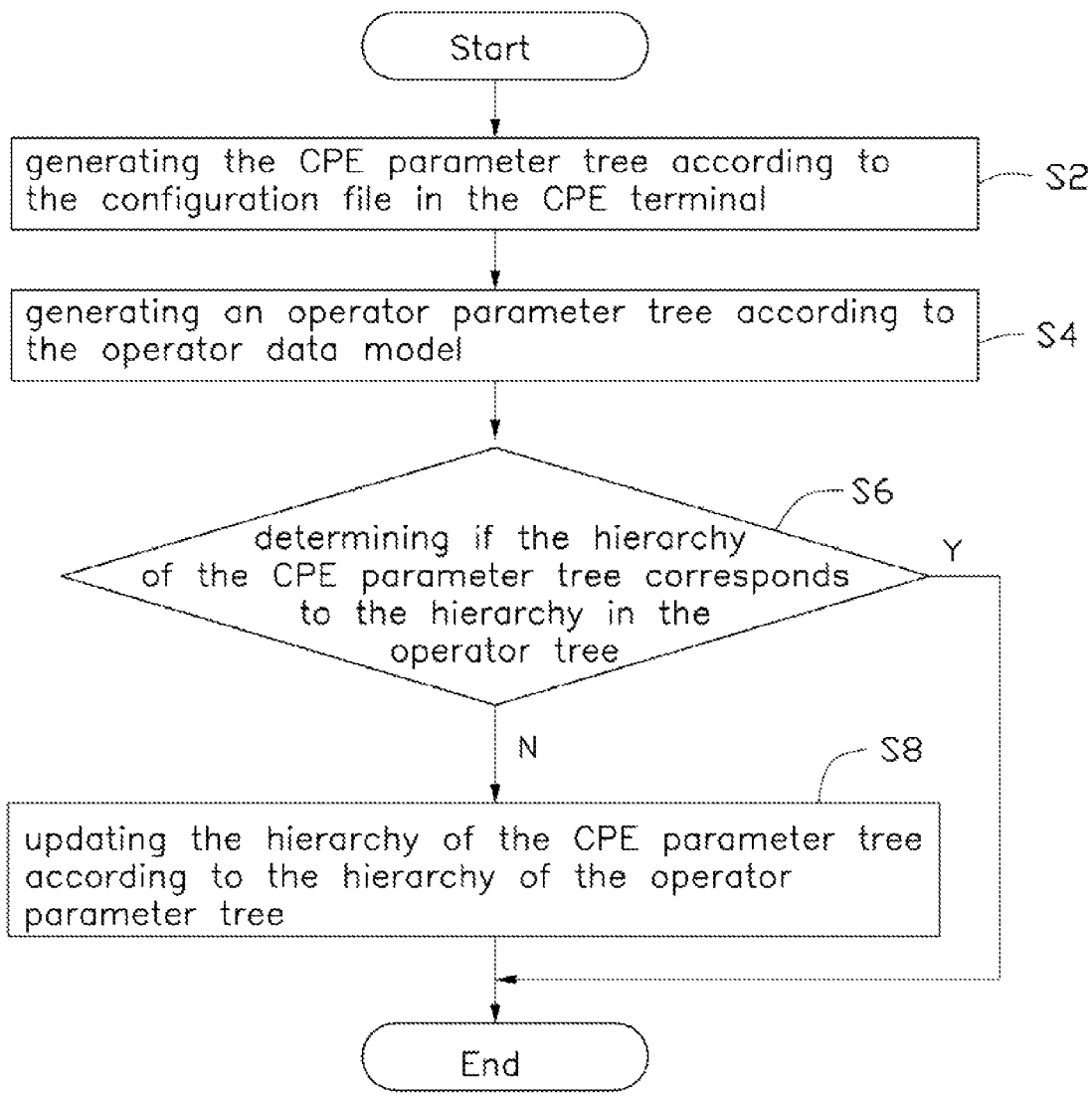
FIG. 9 is a flowchart of one embodiment of the present disclosure, illustrating generation of the operator parameter tree and the CPE parameter tree.

FIG. 9 is a flowchart of one embodiment of the present disclosure, illustrating generation of the operator parameter tree and the CPE parameter tree. In block S2, the tree-generation module 12 generates the CPE parameter tree according to the configuration file 110 in the CPE terminal 1. In block S4, the tree-generation module 12 generates an operator parameter tree according to the operator data model 112. In block S6, the determination module 14 determines if the hierarchy of he CPE parameter tree corresponds to the hierarchy in the operator tree, that is, the determination module 14 determines if all parameters in the operator parameter tree have corresponding parameters in the CPE parameter tree. If the determination module 14 determines the hierarchy of the CPE parameter tree corresponds to the hierarchy of the operator parameter tree, the method of FIG. 9 ends. If the determination module 14 determines the hierarchy of the CPE parameter tree does not correspond to the operator parameter tree, and the block S8 is implemented. In block S8, the update module 15 updates the hierarchy of the CPE parameter tree according to the hierarchy of the operator parameter tree, and assigns the parameter values of the operator tree to the parameter values of the CPE parameter tree. After the update, the method is complete.

Figure 10:
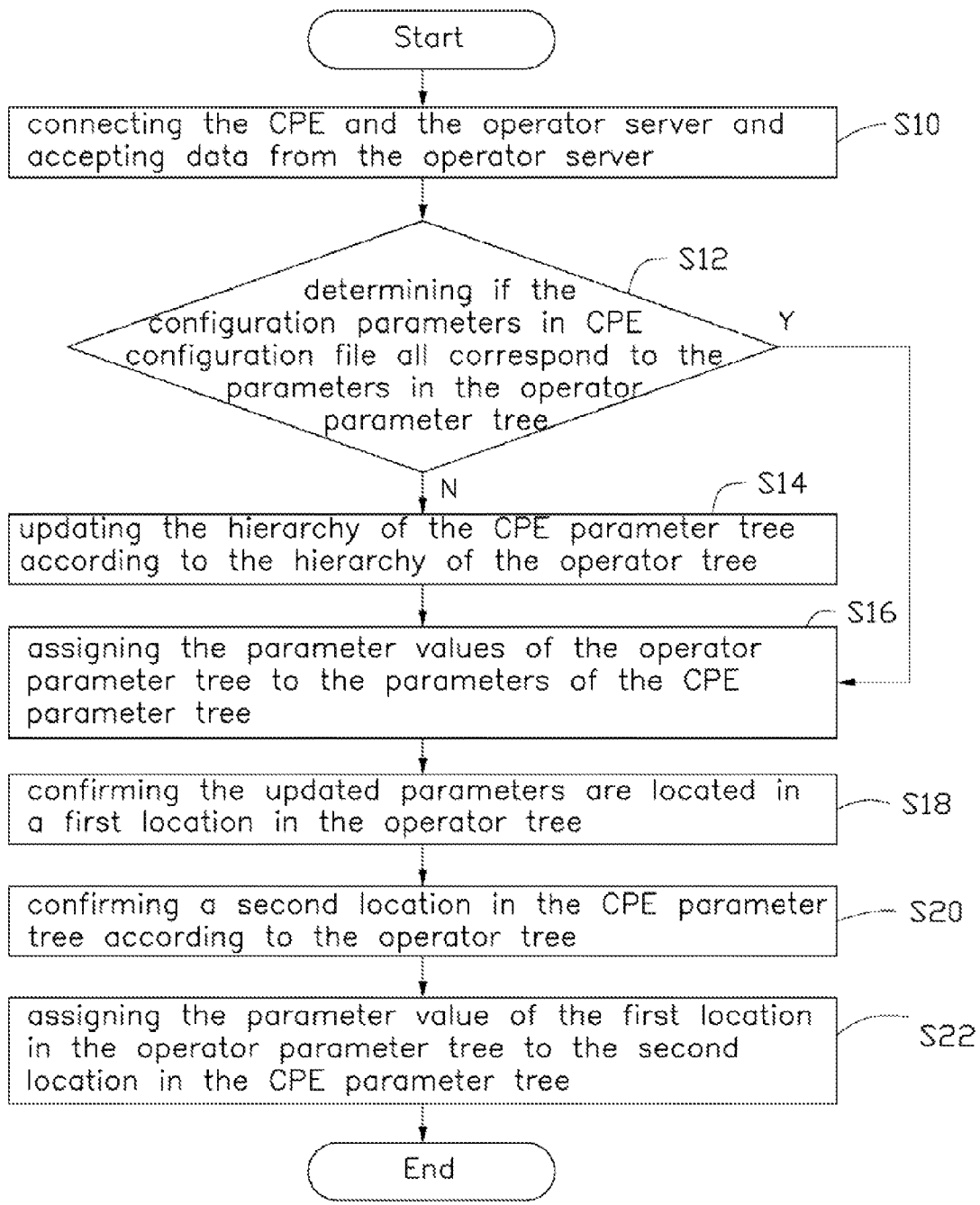
FIG. 10 is a flowchart illustrating the updates of parameters in the CPE parameter tree according to one embodiment of the present disclosure.

FIG. 10 is a flowchart illustrating the update of parameters in the CPE parameter tree according to one embodiment of the present disclosure. In block S10, the communication module 13 connects the CPE 1 and the operator server 3 through a network 2, and accepts data from the operator server 3. In block S12, the determination module 14 determines if the configuration parameters in CPE configuration file all correspond to the parameters in the operator parameter tree individually. If the determination module 14 determines the configuration parameters in the CPE parameter tree correspond to the parameters in the operator parameter tree individually, block S16 is implemented. If the determination module 14 determines the configuration parameters in the CPE parameter tree do not correspond to the parameters in the operator parameter tree, the update module 15 updates the hierarchy of the CPE parameter tree according to the hierarchy of the operator tree in block S14. In block S16, the update module 15 assigns the parameter values of the operator parameter tree to the parameters of the CPE parameter tree. In block S18, the location confirmation module 16 confirms the updated parameters are located in a first location in the operator tree. In block S20, the location confirmation module 16 confirms a second location in the CPE parameter tree according to the operator tree. In block S22, the update module 15 assigns the parameter value of the first location in the operator parameter tree to the second location in the CPE parameter tree. The method is complete.

The disclosure provides a method of updating parameters in a CPE configuration file based on the parameters in the operator configuration file without comparing the parameter names of the CPE configuration file with the parameters in the operator configuration file individually, thereby optimizing update efficiency for the CPE configuration files.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A customer premises equipment (CPE) comprising:
   a storage module that stores a configuration file of the CPE and a data model of an operator server;
   a communication module that electronically connects the CPE to the operator server to download configuration data from the operator server, the configuration data including configuration parameters, configuration parameter names and configuration parameter values of the operator server;
   a generation module that generates a CPE parameter tree based on parameters relating to the CPE device that are stored in the configuration file of the CPE, and an operator parameter tree based on the configuration data of the operator server;
   a determination module that determines if configuration parameters of the CPE parameter tree correspond to configuration parameters of the operator parameter tree individually, without comparing configuration parameter names;
   an update module that assigns configuration parameter values of the operator parameter tree to the configuration parameter values of the CPE parameter tree when the configuration parameters of the CPE parameter tree correspond to the configuration parameters of the operator parameter tree individually; and
   a location confirmation module that confirms if a configuration parameter to be updated is in a first location in the operator parameter tree which corresponds to a second location in the CPE parameter tree; and
   the update module further assigns the configuration parameter in the first location of the operator parameter tree to the configuration parameter in the second location of the CPE parameter tree.

2. The CPE as claimed in claim 1, wherein the update module updates hierarchy of the CPE parameter tree based on hierarchy of the operator parameter tree when the configuration parameters of the CPE parameter tree do not correspond to the configuration parameters of the operator parameter tree, so that each of the parameters in the operator parameter tree corresponds to each of the parameters in the CPE parameter tree.

3. A computer-implemented method for updating parameters in customer premises equipment (CPE), the method comprising:
   storing a configuration file of the CPE and a data model of an operator server;
   communicating the CPE with the operator server and accepting configuration data from the operator server, the configuration data comprising configuration parameters, configuration parameter names and configuration parameter values of the operator server;
   generating a CPE parameter tree according to parameters relating to the CPE device that are stored in the configuration file of the CPE, and generating an operator parameter tree according to the configuration data of the operator data model;
   determining if hierarchy of the CPE parameter tree corresponds to hierarchy of the operator parameter tree by determining if configuration parameters of the CPE parameter tree correspond to configuration parameters of the operator parameter tree individually, without comparing configuration parameter names;
   assigning the parameter values of the operator parameter tree to the parameters of the CPE parameter tree when the hierarchy of the CPE parameter tree corresponds to the hierarchy of the operator parameter tree to update the parameters;
   determining if the hierarchy of the CPE parameter tree corresponds to the hierarchy of the operator parameter tree further comprises determining a parameter to be updated is in a first location in the operator parameter tree corresponding to a second location of the CPE parameter tree; and
   assigning the parameter values of the operator parameter tree to the parameters of the CPE parameter tree further comprises assigning the parameter value of the first location of the operator parameter tree to the parameter of the second location of the CPE parameter tree.

4. A non-transitory storage medium having stored thereon instructions that, when executed by a processor, causing the processor to perform a method to update parameters in customer premises equipment (CPE), wherein the method comprises:
   storing a configuration file of the CPE and a data model of an operator server;
   communicating the CPE with the operator server and accepting configuration data from the operator server, the configuration data comprising configuration parameters, configuration parameter names and configuration parameter values;
   generating a CPE parameter tree according to parameters relating to the CPE device that are stored in the configuration file of the CPE, and generating an operator parameter tree according to the configuration data of the operator data server;
   determining if hierarchy of the CPE parameter tree corresponds to hierarchy of the operator parameter tree by determining if configuration parameters of the CPE parameter tree correspond to configuration parameters of the operator parameter tree individually, without comparing configuration parameter names;
   assigning the parameter values of the operator parameter tree to the parameters of the CPE parameter tree when the hierarchy of the CPE parameter tree corresponds to the hierarchy of the operator parameter tree to update the parameters;
   determining if the hierarchy of the CPE parameter tree corresponds to the hierarchy of the operator parameter tree further comprises determining a parameter to be updated is in a first location in the operator parameter tree corresponding to a second location of the CPE parameter tree; and
   assigning the parameter values of the operator parameter tree to the parameters of the CPE parameter tree further comprises assigning the parameter value of the first location of the operator parameter tree to the parameter of the second location of the CPE parameter tree.

* * * * *